July 15, 1958 R. B. ASHLEY 2,843,747

AUTOMATIC ALIGNMENT SYSTEM

Filed March 8, 1957 3 Sheets-Sheet 1

INVENTOR:
ROBERT B. ASHLEY
BY Donald N. Timlie
HIS ATTORNEY.

INVENTOR:
ROBERT B. ASHLEY.
BY Donald N. Timbie
HIS ATTORNEY.

July 15, 1958 R. B. ASHLEY 2,843,747

AUTOMATIC ALIGNMENT SYSTEM

Filed March 8, 1957 3 Sheets-Sheet 3

INVENTOR
ROBERT B. ASHLEY.
BY Donald N. Timbie
HIS ATTORNEY.

United States Patent Office 2,843,747

Patented July 15, 1958

2,843,747

AUTOMATIC ALIGNMENT SYSTEM

Robert B. Ashley, Syracuse, N. Y., assignor to General Electric Company, a corporation of New York Application March 8, 1957, Serial No. 644,789

16 Claims. (Cl. 250—40)

The present invention relates to a system for automatically aligning a plurality of interdependent tuned stages of an electronic device such as a television set or a radio.

Many electronic devices have interdependent stages of tuned circuits, each of which can be tuned to an individual frequency so that the combined effect of all the stages passes or rejects a definite band of frequencies with approximately equal attenuation. In the past this alignment has been accomplished manually. In one method of manual alignment, an operator connects to the input of the electronic device a sweep circuit that produces a wave having frequencies that are swept over and beyond the desired tuning band. As the input is swept, he observes the resulting output on an oscilloscope joined to the output of the electronic device. He then manually adjusts the various tuning elements of the tuned circuits until the response curve as observed on the oscilloscope has the desired shape and is in the desired frequency band.

Because of the complex electronic equipment involved in this manual operation, only skilled laborers can perform it. The requirement of skilled labor is a disadvantage because of the expense involved in training the laborer and also because of the higher wages that the skilled laborer can demand.

Accordingly, an object of the present invention is to provide an alignment system that can be operated by non-skilled labor.

Manual alignment is also expensive because of the low rate of alignment; a skilled laborer can align, at most, only seven tuners per hour. An alignment system providing a higher rate of alignment would be advantageous.

Thus, another object of the present invention is the provision of an alignment system that is capable of a high rate of output.

Another disadvantage of manual alignment is the low quality and the non-uniformity of the resulting alignments. Each operator uses his own individual judgment in aligning, and because judgment differs with individuals, each operator aligns a tuned circuit slightly differently, and in fact during the period of only one day, the same operator will not align the tuned circuits in exactly the same manner each time. The resulting differences are often sufficiently significant to produce differences in the performances of the television sets or whatever electronic devices the circuits are used in.

Therefore, another object of the present invention is to provide an automatic alignment system that can be operated without the exercise of judgment.

Briefly, one form of my invention is as follows. The input to the device that is to be aligned is energized by a plurality of pairs of waves in which the amplitude and frequencies of the two waves of each pair are such that when the device is aligned it produces an output signal having equal amplitudes for the two waves of each pair. The waves of each pair are applied alternately at a rate that is much lower than the frequencies of these waves.

Because these waves are applied alternately, any difference in amplitude in the output from the device corresponding to these waves, takes the form of a square wave having one value during the occurrence of one wave of a pair having one frequency and another value during the occurrence of the other waves of the same pair having a different frequency. A motor system responds to the resulting square wave components to adjust the tuning elements of the tuned stages in directions such that the response curve approaches the desired shape. When the response curve is as desired, that is when the device is aligned, the square wave components decrease to zero amplitude and thus the motor system stops functioning thereby leaving the tuning elements in their proper aligned positions.

The features of my invention that I believe to be novel are set forth with particularity in the appended claims. My invention, itself, however, both as to its organization and method of operation, together with further objects and advantages thereof, may best be understood by reference to the following description taken in connection with the accompanying drawings in which:

Figure 1:
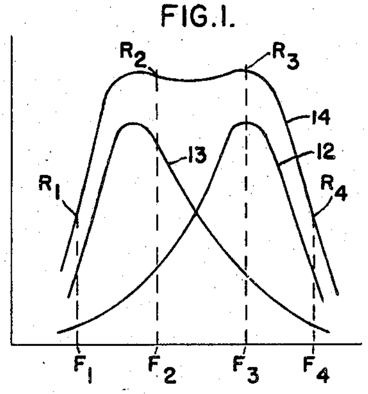
Fig. 1 shows an overall response curve and the two response curves that are combined to produce this overall response curve.

Referring to Fig. 1, three response curves 12, 13, and 14 are shown. The ordinate values of these curves represent attenuation if these curves are for rejection bands or represent the inverse of attenuation if these curves represent pass-bands. The abscissa values are the frequencies in the pass or rejection bands. Curves 12 and 13 are response curves, respectively, of two resonant circuits in an electronic device that is to be aligned. That is, the positions of curves 12 and 13 are the positions of these curves when the device is aligned to produce the overall response curve 14.

Although the present invention can align any type of tuned circuit arrangement, whether over-coupled or stagger-tuned, the following discussion is based upon an alignment of a stagger-tuned device. Thus curve 14, which is used in this discussion, is formed from the stagger tuning of the resonant circuits corresponding to curves 12 and 13. Curve 14 is produced by the addition of the ordinate values of curves 12 and 13 for all of the abscissa frequencies. The present invention can align devices having any number of tuned circuits, but the explanation, although simpler, is complete and adequate if a device having only two resonant circuits is considered.

Figure 2:
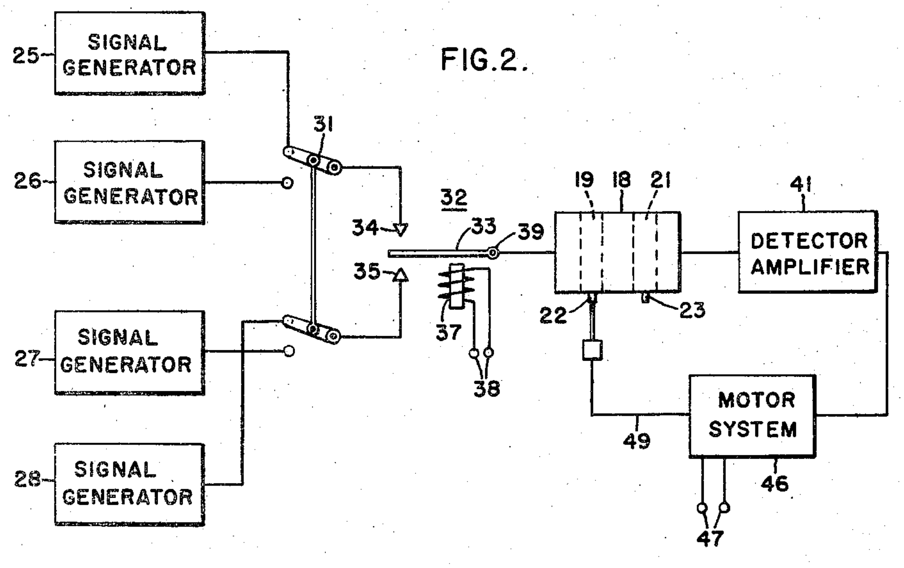
Fig. 2 is one embodiment of the present invention.

There are several important factors about the curves and frequencies $f_1$ to $f_4$ of Fig. 1 that should be noted at this point in the discussion. The response $R_1$ at frequency $f_1$ is equal to the response $R_4$ at frequency $f_4$. Also, the response $R_2$ at frequency $f_2$ is equal to the response $R_3$ at frequency $f_3$. Another feature of interest is that the frequencies $f_1$ to $f_4$ are spread fairly evenly over curve 14. It should also be noted that frequency $f_4$ is at a point of curve 12 where the slope is high but frequency $f_1$ is at a point on this curve where the slope is low. Likewise, frequency $f_2$ is at a point of curve 13 where the slope is high and frequency $f_3$ is at a point where the slope is low. The significance of the responses, the even spread, and differences in slopes is explained infra, The block diagram of Fig. 2 is one embodiment of my invention. The device 18 has two resonant circuits 19 and 21 that are to be adjusted through their respective tuning elements 22 and 23 to produce curve 14 of Fig. 1. When device 18 is aligned, curve 12 of Fig. 1 is the response of circuit 19 and curve 13 is the response of circuit 21.

It was previously mentioned that in this invention the sweep circuit of the manual alignment method is not used but instead a plurality of signal generators energizes the input of the device that is to be aligned. It has been found that a device can be aligned using the concepts of the present invention if only two signal generators are provided to correspond to each resonant circuit that is to be adjusted. Thus, in Fig. 2 four signal generators are shown. Generators 25 and 28 generate waves of equal amplitudes with frequencies $f_1$ and $f_4$, respectively, that are used in the adjustment of circuit 19. And generators 26 and 27 generate waves of equal amplitude with frequencies $f_2$ and $f_3$, respectively, that are used in the adjustment of resonant circuit 21.

Switch 31 switches to either one pair of generators 25, 28 or to the other pair 26 and 27. For its shown position, it conducts the output of generator 25 to terminal 34 and the output of generator 28 to terminal 35. Switch 31 can be nearly any type switch capable of performing this function; but, of course, it must be able to handle the high frequencies that $f_1$ to $f_4$ may be in some applications.

Sampling switch 32 has a vibrating reed 33 that contacts with terminal 34 or terminal 35 under the influence of a magnetic field produced in coil 37 by an electrical signal applied at terminals 38. This switch, through reed 33, alternately joins the signals on terminals 34 and 35 to the input of device 18. For the shown position of switch 31, device 18 is energized by a wave having a portion with frequency $f_1$ followed by a portion with frequency $f_4$ which is in turn followed by a portion with frequency $f_1$, etc.

Figure 3:
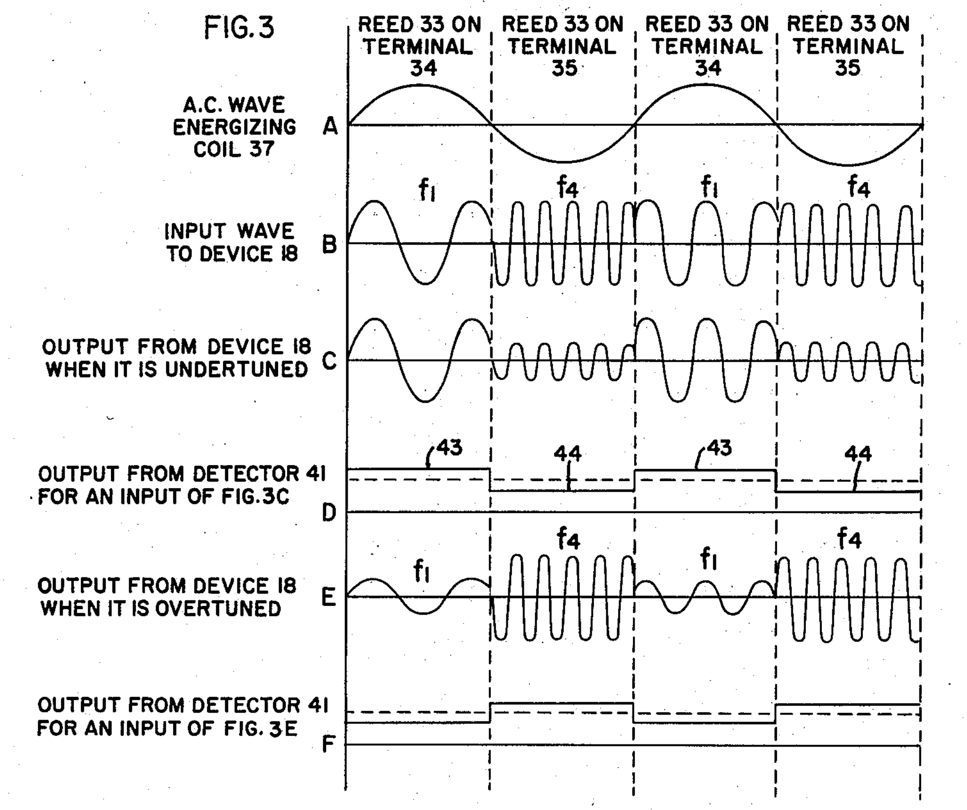
Figs. 3A to 3F are graphical representations of waves that occur at various points in the circuit of Fig. 2.

The current wave energizing terminals 38 is shown in Fig. 3A and the portions from switch 32 energizing device 18 are shown in Fig. 3B. The frequency of operation of switch 32, which is the same as the frequency of the current wave energizing terminals 38, is much lower than the lowest of the frequencies $f_1$ to $f_4$ and thus each portion in the output of switch 32 contains many cycles of the wave from the corresponding generator. The wave of Fig. 3B is in phase with the current wave of Fig. 3A due to an innate characteristic of the sampling switch 32. When the current wave to this switch is positive, reed 33 is moved to one terminal, say terminal 34, and when it is negative this reed is moved to the other terminal, say terminal 35. The relationship between the position of the reed 33 and the polarity of the wave energizing terminals 38 can be the reverse from that as just stated; however, for convenience in the following discussion the relationship is assumed to be as stated. The switching time that it takes for reed 33 to travel between terminals 34 and 35 has been neglected because it is too small to be significant.

Device 18 attenuates the portions from switch 32 in proportion to its response curve. If device 18 is aligned, the portions of frequencies $f_1$ and $f_4$ are attenuated the same amount because $R_1$ equals $R_4$. With this attenuation the amplitude of the portion in the output from device 18 containing these frequencies is the same because the portions of both frequencies had the same amplitude before entering device 18 and were attenuated the same in device 18. In other words, when device 18 is aligned there is a constant level envelope for all portions. If device 18 is misaligned the attenuation for portions of at least one pair of frequencies, and probably both, is different. Assume the misalignment is such that the portions of frequencies $f_1$ and $f_4$ are attenuated by different amounts. Then, the output from device 18 for portions having frequency $f_1$ is different from that for the portions having frequency $f_4$.

Assume the misaligned condition is such that wave 12 of Fig. 1 is to the left a bit from its shown position; i. e. the resonant frequency of circuit 19 is lower than that desired. Then the lower part (left end) of the response curve 14 in the vicinity of frequency $f_1$ is greater than that shown, and the upper part (right end) in the vicinity of frequency $f_4$ is less. With this undertuned condition the amplitude of the portions of frequency $f_1$ in the output of device 18 is greater than that of the portions with frequency $f_4$. The resulting output from device 18 is shown in Fig. 3C.

Detector-amplifier 41, which is energized by the output of device 18, has a detector portion that eliminates the frequencies $f_1$ and $f_4$ thereby passing only the envelope of the output of device 18. This envelope is shown in Fig. 3D. The amplifier portion amplifies the detected wave to a level suitable for energizing motor system 46. This amplifier is preferably an A.-C. amplifier having a coupling capacitor, transformer, or the like, for removing the D.-C. component of the detected wave of Fig. 3D. The dotted line in this figure shows the D.-C. component which is the average value. When this D.-C. component is removed in the A.-C. amplifier, the higher amplitude portions 43 of this wave have a positive polarity but the lower amplitude portions 44 have a negative polarity. It is to be noted that this A.-C. wave is in phase with the wave of Fig. 3A.

If device 18 is overtuned; that is if curve 12 is too far to the right rather than to the left, then the amplitude of the upper end of curve 12 around frequency $f_4$ is greater and the amplitude of the lower end around frequency $f_1$ is less than that shown in Fig. 1. Then the portions in the output of device 18 of frequency $f_1$ have a smaller amplitude than the portions having frequency $f_4$, as is shown in the wave of Fig. 4E. The wave of Fig. 4F, which is the resulting output from detector-amplifier 41, is an A.-C. wave that is 180 degrees out of phase with the wave of Fig. 4A. Thus, if curve 12 is displaced in one direction from its proper position, the output of detector-amplifier 41 and the current to terminals 38 are in phase, and if this curve is displaced in the opposite direction, these waves are 180 degrees out of phase. The significance of these phase relationships will be explained later.

Motor system 46 rotates, through mechanical linkage 49, tuning element 22 in one direction if the two input waves to this system are in phase and in the opposite direction when these waves are 180 degrees out of phase. This motor system can be any one of a number of suitable types of motors; for example, the common two-phase motor is suitable if a 90 degrees phase shifter is used to shift one of the input waves so that there is a 90 degree phase difference in the two waves applied to the motor. Detector-amplifier 41 supplies one input to system 46 and a voltage applied to terminals 47 supplies the other. The current resulting from the voltage applied to terminals 47 should be in phase with the current supplied to terminals 38 of switch 32 so that, as was previously described in the discussion of Figs. 3A and 3D, this current is either in phase or out of phase with the voltage output from detector-amplifier 41. A simple method of obtaining this phase relationship is to use the same voltage source for terminals 47 that is used for terminals 38; this voltage in some applications may be the 60 cycle line voltage.

As was previously mentioned, when the current applied to terminals 38—and thus the current applied to terminals 47—and the voltage from detector-amplifier 41 are in phase, curve 12 of Fig. 1 is on one side of its proper position and when this current and voltage are 180 degrees out of phase this curve is on the opposite side. Resonant circuits are such that their tuning elements (either variable capacitors or inductors) when moved—usually rotated—in one direction cause a lowering of the resonant frequency and when moved in the opposite direction cause a raising of the resonant frequency. Because motor system 46 causes a rotation of tuning element 22 in one direction when its two input waves are in phase and a rotation in the opposite direction when these waves are out of phase, this motor system always moves tuning element 22 in a direction such that the amplitude of the portions of frequency $f_1$ in the output of device 18 becomes equal to the amplitude of the portions of frequency $f_4$. When the two amplitudes are equal the amplitude of the A.-C. output from detector-amplifier 41 decreased to zero. With one input at zero amplitude, motor 46 ceases rotating tuning element 22.

After the rotation of tuning element 22 ceases, the operator should change switch 31 to generators 26 and 27 and move the mechanical linkage 49 to tuning element 23. The invention will then operate in a manner similar to that just explained. After the tuning element 23 is adjusted so that the amplitude of the portions at frequency $f_2$ equals the amplitude of the portions at frequency $f_3$, the operator should then repeat the operation with tuning element 22. At first blush it may seem that only two adjustments should be necessary; one for tuning element 22 and one for tuning element 23. This is not necessarily so, because the present invention does not necessarily move the tuning elements immediately to their aligned positions. What it does is to adjust each tuning element so that the portions of each pair instantaneously energizing device 18 have equal amplitudes in the output of device 18. Device 18 does not have to be aligned to produce this condition for the portions of one pair of frequencies. However, it can be shown that if this process is done repeatedly so that there are several adjustments of each tuning element, device 18 will become aligned in a short time. The operation must be done repeatedly because the change of the resonant frequency of one resonant circuit has an effect on the amplitude of the two waves in the output of device 18 corresponding to the other resonant circuit. That is, for example, when tuning element 23 is adjusted it probably moves the response curve 13 so that in the overall response curve 14, the responses at frequencies $f_1$ and $f_4$ are different although by a prior adjustment they were made the same. Likewise, when tuning element 22 is adjusted for the second time it probably affects the response curve 14 such that the responses at frequency $f_2$ and $f_3$ are no longer equal. However, if the adjustments are continually repeated, in a short time a switching of switch 31 will not result in a rotation of the output of motor 46. This lack of rotation is an indication that device 18 is aligned.

Perhaps now the selection of the frequencies and Fig. 1 can be better understood. The frequencies $f_1$ and $f_4$, that are used to adjust resonant circuit 19, were chosen so that a slight movement of curve 12, which is the response curve of circuit 19, produces a big difference between the amplitude of the portions having frequencies $f_1$ and $f_4$. The response at frequency $f_1$ does not change much for large changes of the resonant frequency of curve 12 because frequency $f_1$ is located on a portion of curve 12 having little slope. In comparison, however, the response for frequency $f_4$ changes a great deal for only small changes of the resonant frequency. This is because frequency $f_4$ is located on a portion of curve 12 having a large slope. Therefore, the difference between $R_1$ and $R_4$ is great for only small changes in the resonant frequency of curve 12. The same discussion is valid for the selection of frequencies $f_2$ and $f_3$ in relation to curve 13 that are used in the adjustment of circuit 21. Because the difference between responses for at least one pair of waves energizing device 18 increases greatly with a small change in the position of one of the resonant curves from its aligned position, there is always an alternating signal from detector-amplifier 41 of sufficient amplitude for energizing motor system 46 to adjust the tuning element of the misaligned tuned circuit. Furthermore, due to the increase in the difference in responses for at least one pair of frequencies with an increase in the distance of a resonant curve from its aligned position, the alternating signal from detector-amplifier 41 corresponding to this pair of frequencies has a greater amplitude the further this curve is from its aligned position. Because the speed of operation of motor system 46 increases with an increase of amplitude of the alternating signal from detector-amplifier 41, this motor system moves the corresponding tuning element fast when it is far from its aligned position and slow when it is close to its aligned position. The fast movement provides a quick response and the slow movement ensures that there is very little or no hunting.

In the above explanation it was assumed that the amplitude of the output from generator 25 equaled that of signal generator 28, and that the amplitude of the output from generator 26 equaled that of generator 27. This assumption was necessary because the frequencies selected, $f_1$ to $f_4$, were at points of response curve 14 that gave equal attenuation for the frequencies of each pair. This is probably the most practical method of operating this system, but it is not the only method. One basic requirement of this invention is that both portions in the output of device 18 be of equal amplitude when the relative response of device 18 at the frequencies of the two waves energizing the input is the same as that of the response curve 14 at these frequencies. This requirement can be met as well by the selection of frequencies on response curve 14 for which the attenuations are not equal. Then, of course, the amplitudes of the outputs of each of the generators in a pair must be balanced accordingly. For example, assume that frequencies $f_4$ and $f_2$ are used as a pair to adjust a circuit and that there is three times as much attenuation at frequency $f_4$ as there is at frequency $f_2$. For the desired output from device 18, the amplitude of the wave of frequency $f_4$ energizing the input to device 18 must then be three times the amplitude of the wave at frequency $f_2$. These differences in amplitude can be obtained by adjusting the signal generators or by inserting amplifiers or attenuators between the signal generators and the input to device 18. This system then works in the manner explained above.

The embodiment of Fig. 2 overcomes the disadvantages of manual alignment. Skilled labor is not required because the operator need only to know when to operate switch 31 and when to move mechanical linkage 49. The judgment the operator must exercise or have is inconsequential in comparison to that required for manual alignment. The alignments produced by this embodiment are substantially identical because the personality of the operator is not a factor. Also, there is a saving in time with this embodiment—an alignment takes less than a minute as compared to the nine minutes required for the manual operation.

Figure 4:
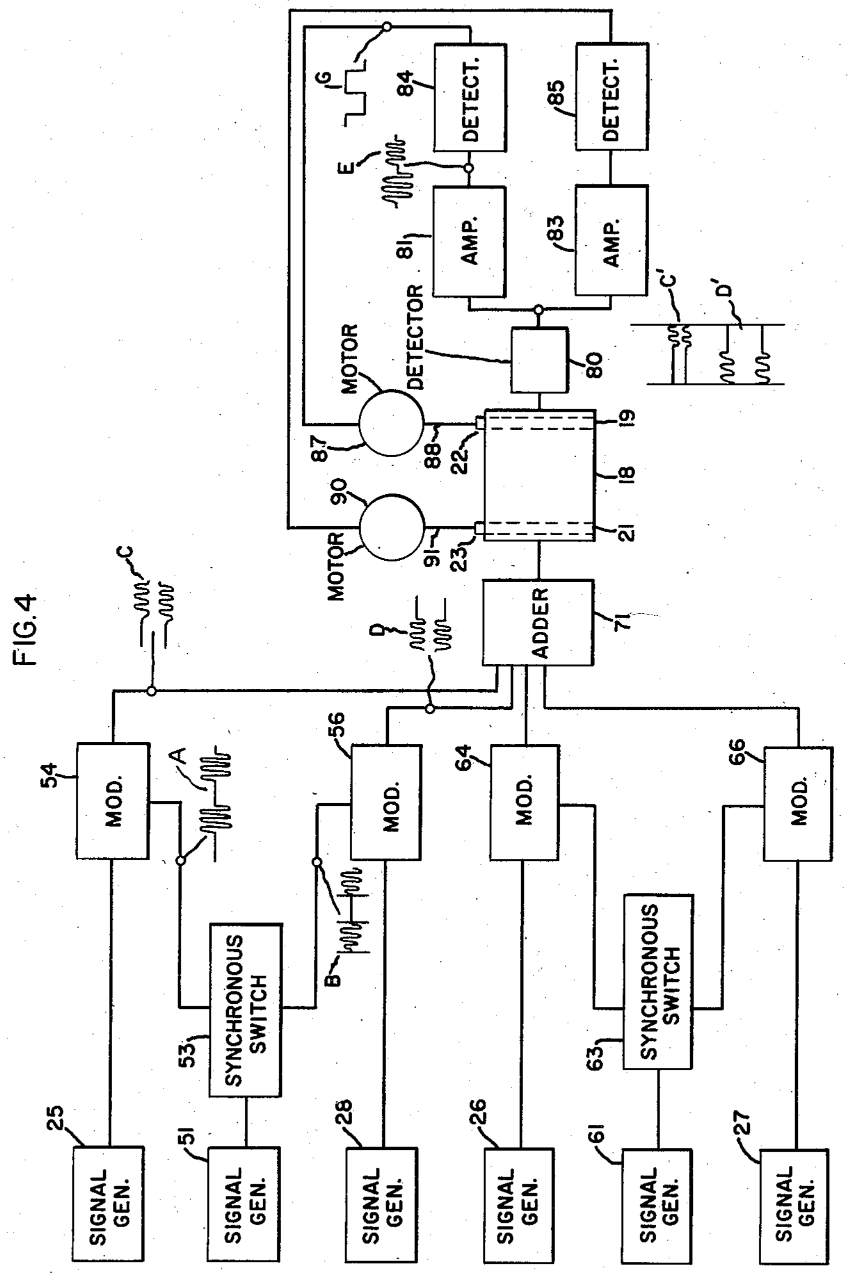
Fig. 4 is another embodiment of the present invention.

Even though the alignment that can be had with the system of Fig. 2 is fast, a system that provides simultaneous alignment in which all of the resonant circuits are aligned simultaneously would obviously be much faster. The invention embodiment of Fig. 4 is a simultaneous alignment system. As in the explanation of the Fig. 2 embodiment, in the following discussion of the Fig. 4 embodiment the alignment of only two resonant circuits is explained. However, the operation is the same regardless of whether two, three, four, or any number of resonant circuits are to be aligned.

Assume that the desired response curve for device 18 is curve 14 of Fig. 1 and that signal generators 25, 28 and 26, and 27 produce waves having frequencies $f_1$, $f_4$ and $f_2$, $f_3$, respectively, as is shown in Fig. 1. As explained in the discussion of the Fig. 2 embodiment, with this selection of frequencies the amplitude of the waves from the signal generators of each pair are preferably equal.

In the present invention means must be provided to identify the signals of each pair of waves having amplitudes that are equal in the output of device 18 when it is aligned. In the Fig. 2 embodiment this identifying means is switch 31 which operates to connect only the waves of one pair of waves to the input of the device 18 at any one time. By noting the position of the switch the operator can tell what waves are energizing device 18. In the case of simultaneous alignment, however, all of the waves simultaneously energize the input to the device 18 and thus a switch such as switch 31 can not be used. Other means must be found for identifying the pairs of waves. In the Fig. 4 embodiment this means is a modulating system that modulates each pair of waves with a different frequency. The modulating frequencies are provided by signal generators 51 and 61 which generate signals having frequencies $F_1$ and $F_2$, respectively, that are preferably much lower than the frequencies $f_1$ to $f_4$. Frequency $F_2$ is preferably twice or triple the frequency of $F_1$.

This embodiment operates, as does the embodiment of Fig. 2, on the principle of alternate application of the waves of each pair of signals to the input of device 18. This alternate application can be performed in at least two different methods. In Fig. 2 it is done by inserting a switch 32 between the signal generators and the input to device 18. If a modulator system is used, the signals of each pair can be effectively alternately applied if the modulator signals are alternately applied to the signal generator signals even though the generator signals are applied to the input of device 18 without interruption. This will be clearer as the discussion progresses. Synchronous switches 53 and 63 are the means for alternately applying the frequencies $F_1$ and $F_2$, respectively, to the modulators for the pairs of signal generators 25, 28, and 26, 27, respectively. Synchronous switch 53 switches the output from generator 51 alternately to modulators 54 and 56. Wave A is the portion of this output that energizes modulator 54 and wave B is the portion that energizes modulator 56. Of course the fundamental frequency of waves A and B is equal to the frequency of alternation of synchronous switch 53 which in turn is equal to the frequency of the energizing signal applied to this switch. The phase relationship between a synchronous switch and its energizing signal was discussed in regard to switch 32 of the Fig. 2 embodiment. In fact switch 53 can be the same type switch as switch 32. Due to the operation of switch 53, at any single time, only one of the waves A and B contain the frequency $F_1$. That is, during the half period of wave B in which this frequency component appears, the amplitude of wave A is zero. And during the following half period the amplitude of wave B is zero and wave A has the frequency $F_1$. Modulator 54 impresses wave A upon the wave from generator 25 to produce wave C. During the half period in which wave A is zero amplitude, wave A has no effect upon the output of signal generator 25 but during the half period in which wave A has frequency $F_1$ the wave from generator 25 is modulated with frequency $F_1$. Of course wave C is only the envelope of the signal from modulator 54; there is actually a frequency $f_1$ component within this envelope. In a similar manner, modulator 56 produces wave D. Signal generator 61, synchronous switch 63, and modulators 64 and 66 operate in a similar fashion on the outputs from signal generators 26 and 27 except that the modulating signal for these generators has a frequency $F_2$.

The outputs from all of the modulators energize adder 71 which combines its plural inputs into a single output that energizes the input of device 18. If device 18 is aligned, the two waves from each pair of modulators are attenuated by the same amount. In the general case, however, the device 18 is not aligned and although for some pairs of waves there may be equal attenuation, for others there won't be. For purposes of explanation assume that device 18 is misaligned to a degree such that it does not attenuate waves C and D by the same amount, and that wave C is attenuated more than wave D. The resulting waves in the output of device 18 are waves C′ and D′.

Waves C′ and D′ energize the input to a detector 80 that removes the frequency $f_1$ from wave C′ and the frequency $f_4$ from wave D′. Thus, in the output of detector 80 the waves corresponding to waves C′ and D′ are both of frequency $F_1$ but they occur alternately. The output of detector 80 energizes the inputs to two frequency selective amplifiers 81 and 83. Amplifier 81 is tuned to frequency $F_1$. Thus, amplifier 81 passes only the waves corresponding to waves C′ and D′ and no other waves. For the shown cycle of waves C′ and D′, the $F_1$ frequency modulation in wave C′ occurs only during the last half period and in D′ only during the first half period. Thus, amplifier 81 during the first half period passes the wave in the output of detector 80 corresponding to $F_1$ modulated portion of wave D′ which is not attenuated very much and during the second half period passes the wave corresponding to the $F_1$ modulated portion of wave C′ which is attenuated by a large amount, thereby producing wave E. Now it can be understood why the alternate modulation that is produced by switch 53 produces substantially the same action as does switch 32 of the Fig. 2 embodiment because as in the Fig. 2 embodiment, the output of device 18 of the Fig. 4 embodiment, after it passes through the frequency selective amplifiers, comprises alternate portions of the waves from the corresponding pair of generators. Also, as in the Fig. 2 embodiment, the times of occurrences of the portions in the output of wave E alternate in phase with the alternation of the operation of switch 53.

Detector 84 detects the output of wave E thereby producing wave G which is the envelope of wave E. As in the discussion of the Fig. 2 embodiment, it is assumed that there is a D.-C. bias removing component in detector 84 and thus wave G has positive and negative half cycles wherein the positive half cycles correspond to the half cycle of the wave G having the greater amplitude and wherein the negative half cycle of wave G corresponds to the half cycle of the envelope of wave G having the lower amplitude.

As in the Fig. 2 embodiment a square wave, wave G, energizes the input to a phase-sensitive motor system, here system 87. This motor system has another input (not shown) that comprises a current wave that is in phase with the operation of switch 53. Thus, motor system 87 rotates tuning element 22 through mechanical linkage 88 in a direction depending upon the phase relationship between wave G and the operation of switch 53. In the $F_2$ portion of this embodiment, the output of detector 85 works through motor system 90 and mechanical linkage 91 upon tuning element 23 in a similar fashion. Thus, it is seen that in the embodiment of Fig. 4 all of the tuned circuits are adjusted simultaneously rather than alternately (in the case of two tuned circuits) or in succession (in the case of three or more tuned circuits) as in the Fig. 2 embodiment.

Figure 5:
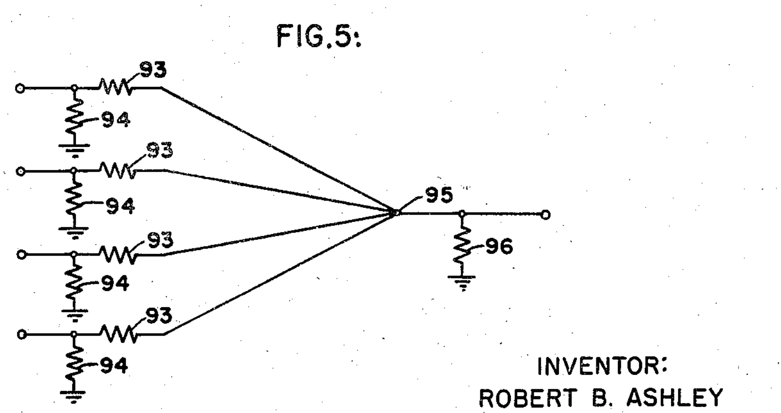
Fig. 5 is a circuit diagram of a circuit suitable for one of the block diagram components of the system of Fig. 4.

Fig. 5 illustrates one adding circuit that is suitable for the adder 71 of the Fig. 4 embodiment. There is a plurality of resistor stages, one for each modulator output. Each stage comprises a series resistor 93 and a shunt resistor 94. The resistor stages are joined together at a terminal 95 that is shunted by resistor 96. One practical embodiment of this adder had resistor values of: resistor 93—470 ohms, resistor 94—51 ohms, and resistor 96—120 ohms. Of course there are many other adder circuits that are equally suitable.

Figure 6:
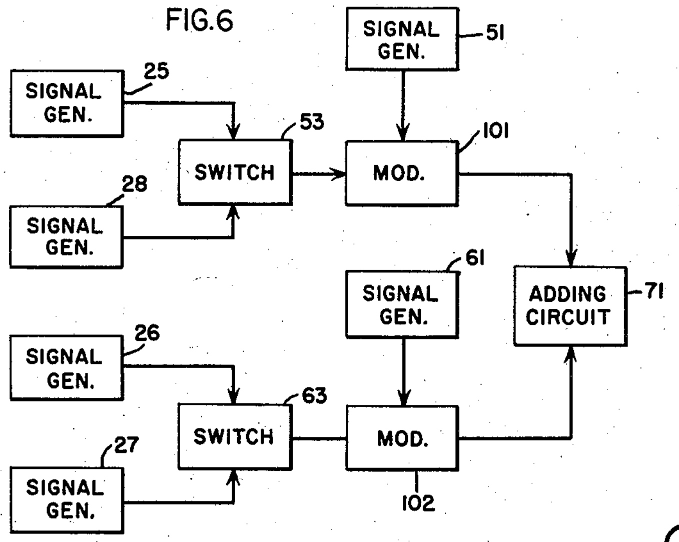
Fig. 6 is a block diagram of a modulator system that can be used in the Fig. 4 embodiment.

Fig. 6 is a modulator circuit that can be employed in lieu of the modulator circuit portion of the Fig. 4 embodiment. In the Fig. 6 embodiment only one modulator modulates the outputs for each pair of signal generators as compared to two modulators in the Fig. 4 embodiment. With the exception of modulators 101 and 102 all of the components in the Fig. 6 embodiment are the same and have the same designative numerals. In the Fig. 6 embodiment, a synchronous switch 53 alternately samples the outputs from generators 25 and 28 to provide one input to modulator 101 having periods of alternate half cycles of frequencies $f_1$ and $f_4$. The other input to this modulator is a wave of frequency $F_1$ from generator 51. Modulator 101 modulates the input from switch 53 with frequency $F_1$ thereby producing periods having half cycles one of which is at a frequency $f_1$ and the other which is at a frequency of $f_4$, both of which are modulated at a frequency $F_1$. This wave from modulator 101 is equal to the summation of the modulated portions of waves C and D of Fig. 4 which, as has been explained in the discussion of that embodiment, are the only effective portions of these waves. So, in effect, the modulating system of Fig. 6 eliminates the non-effective portions of the waves energizing adder 71 and, in so doing, reduces the number of required modulators. Of course, modulator 102 operates in a similar manner upon the output from generators 26 and 27. Another advantage of this modulator scheme over that of the Fig. 4 embodiment lies in the simplification of adder 71. Adder 71 has to provide only one resistor stage for each pair of generators rather than one stage for each generator as in the Fig. 4 embodiment.

The above explanation should show that all of the disclosed embodiments of this invention have in common the energization of the input to a device having resonant circuits wherein the input has at least one pair of waves at frequencies and amplitudes such that the outputs from this device produced by these waves have equal amplitudes if the device is aligned. Any differences in amplitudes are detected and utilized to energize a motor system that drives the tuning elements of the resonant circuits towards their aligned positions. Each pair of these waves must be identified. This can be done by energizing the input to the device with only one pair of these waves at a time, or it can be done by modulating each pair of waves with a distinctive modulating signal. There are no doubt, other equally suitable methods for identifying these waves.

In some applications it may be known that the circuits are either undertuned or overtuned. Then, of course, there is no need for a phase-sensitive motor system because the tuning elements should be moved in only one direction. In these applications a simple motor system having only one input—the square waves from the detector—can be employed. The motor system rotates the tuning elements until the amplitudes of the square waves decrease to zero. With no input the motor system stops moving the tuning elements, thereby leaving them in their aligned positions.

Although my invention has been described by reference to particular embodiments thereof, it will be understood that numerous modifications can be made by those skilled in the art without departing from my invention. I aim in the appended claims to cover all such equivalent variations that come within the true spirit and scope of my invention.

What I claim as new and desire to secure by Letters Patent of the United States is:

1. A system for automatically aligning an electronic device having a plurality of interdependent tuned circuits, said system comprising: a pair of signal generators for producing two signals having frequencies and amplitudes such that when these signals energize said electronic device and said electronic device is properly aligned, the amplitudes of the outputs from said electronic device corresponding to these input signals are the same; sampling means for alternately sampling the outputs from said signal generator; leads for connecting the output of said sampling means to the input of said electronic device; a detector for detecting the output of said electronic device; a motor connected to be energized by the output of said detector; and a mechanical connection for connecting the output of said motor to the tuning element of one of said tuned circuits.

2. An automatic alignment system for aligning the interdependent tuned circuits of an electronic device, said system comprising: at least one pair of signal generators for producing at least two waves at frequencies and amplitudes that produce equal amplitude outputs from said electronic device when it is properly aligned; switch means for alternately switching to the outputs of said pair of signal generators; means for conducting the output of said switch means to the input of said electronic device; detector means connected to detect the output of said electronic device; a reversible motor having one set of windings connected to be energized by the output of said detector and another set of windings connected to be energized by a current that has the same frequency as the frequency of operation of said switch means; and mechanical means for connecting the output of said motor to rotate the tuning element of one of said tuned circuits in said electronic device.

3. An alignment system for producing alignment of the tuned circuits in an electronic device, said system comprising: a pair of signal generators corresponding to each tuned circuit in said electronic device, wherein the frequency and amplitude of the outputs from the two signal generators in each pair are such that two equal amplitude outputs are produced by said electronic device from the signal generator outputs of each pair when said electronic device is aligned; first and second terminals; switch means for connecting the outputs of one pair of these signal generators at a time, so that one output is applied to said first terminal and the other to said second terminal; sampling switch means for alternately sampling the signals on said first and second terminals; leads for conducting the output of said sampling switch means to the input of said electronic device; a detector for detecting the output of said electronic device; a motor having a set of windings connected to the output of said detector; and a mechanical linkage joined to the output of said motor for moving the tuning element of a tuned circuit in said electronic device in response to movements of the output of said motor.

4. The system of claim 3 wherein said motor is a two phase motor having one set of windings adapted to be energized by the output of said detector and having the other set of windings adapted to be connected to a source of current having a frequency equal to the frequency of operation of said sampling switch means.

5. An automatic alignment system for aligning the tuned circuits in an electronic device, said system comprising: a pair of signal generators corresponding to each tuned circuit that is to be aligned in said electronic device, the frequency and amplitude of the output of each of said signal generators of a pair being such that when said electronic device is properly aligned, it produces two equal amplitude outputs corresponding to each pair of generator outputs; means for alternately sampling the outputs of one of said pairs of generators at a time; and means responsive to the phase and magnitude of the variations in the amplitude of the output of said electronic device when it is energized by the output of said sampling means for rotating the tuning element of the tuned circuit corresponding to the pair of signal generators then energizing the input of said electronic device.

6. An automatic alignment system for aligning the interdependent tuned circuits of an electronic device, said system comprising: a pair of signal generators corresponding to each tuned circuit in said electronic device, wherein the amplitude and frequency output of each of the signal generators of a pair is such that when said electronic device is properly aligned, it will produce equal amplitude outputs for each generator output of a pair; switch means having two output terminals for conducting at one time the output of one of the signal generators of a pair to one terminal and for conducting the output of the other signal generator of the same pair to the other output terminal; sampling means for alternately sampling the outputs on said output terminals of said switch means; and means connected to the output of said electronic device and responsive to the phase and amplitude of the variations in the envelope of the output of said electronic device resulting from its energization by the output of said sampling means for rotating the tuning element of the tuned circuit corresponding to the pair of generators to which the switch means are connected for tuning this tuned circuit toward the condition wherein the amplitude variations in the output of said electronic device are decreased.

7. The automatic alignment system of claim 6 wherein said means connected to the output of said electronic device comprises: a detector connected to the output of said electronic device for passing only the envelope of this output, a reversible motor having one set of windings connected to be energized by the output of said detector and another set of windings for connection to a voltage source having a frequency equal to and in phase with the operation of said sampling means, and a mechanical lead for connecting the output of said motor for moving the tuning element of said corresponding tuned circuit.

8. An automatic alignment system for producing alignment of the interdependent tuned circuits of an electronic device, said system comprising: a pair of first signal generators corresponding to each tuned circuit of said electronic device, the amplitude and frequency output of each said signal generators of a pair being such that when said electronic device is properly aligned it produces equal amplitude outputs for both signals in each pair of generator outputs; a plurality of means each of which alternately modulates the output of the individual signal generators of each pair with a distinctive frequency; means for combining all the outputs from said plurality of means into a single output; means for conducting said single output to the input of said electronic device; means for separating out the pairs of signals in the output of said electronic device that have different modulated frequencies; and means responsive to the phase of the variations in the envelope of each of the separated pairs of signals for producing movements of the tuning elements of said tuned circuits in directions such that the variations of each envelope decrease.

9. The system of claim 8 wherein each one of said plurality of means for modulating comprises: a second signal generator operating at a distinctive frequency, two modulators, each of which is connected between the output of a different first signal generator of a pair and an input to said means for combining, and a synchronous switch for alternately conducting the output of said second signal generator to the inputs of said modulators.

10. The system of claim 9 wherein said means for separating comprises: a plurality of tuned amplifiers having an input connected to the output of said electronic device, wherein each of said tuned amplifiers is tuned to a modulating frequency of a different one of said second signal generators; a plurality of detectors each of which is connected to the output of a different one of said tuned amplifiers; a plurality of reversible motors, each of which has one winding connected to a different detector output and another winding connected to be energized by a source of current that has the same frequency as the operation of said synchronous switch; and a plurality of mechanical outputs, each of which is connected between a different one of said reversible motors and a tuning element of a different tuned circuit of said electronic device.

11. The system of claim 8 wherein each one of said plurality of means for modulating comprises: a circuit corresponding to each of said pairs of first signal generators, each of said circuits comprising: a second signal generator operating at a distinctive frequency, a modulator having one input provided by the output of said second signal generator, and a synchronous switch for alternately conducting the outputs of the corresponding pair of said first signal generators to the other input of said modulator.

12. An automatic alignment system for aligning the interdependent tuned circuits of an electronic device, said system comprising: means for producing a plurality of waves having different frequencies, in pairs wherein the two waves of each pair produce the same output from said electronic device when it is aligned; means for conducting said waves to the input of said electronic device; and means responsive to variations in amplitudes of the signals produced in the output of said electronic device by the members of each pair of waves for aligning said tuned circuits.

13. The system of claim 12 wherein the means for producing a plurality of waves comprises pairs of signal generators.

14. The system of claim 13 wherein the means of conducting said waves comprises: a switch having two output terminals for switching to one pair of said signal generators at a time for connecting the output of one signal generator of the pair to one output terminal and the output of the other signal generator to the other output terminal, and a sampling switch for alternately conducting the signals on said two output terminals to the input of said electronic device.

15. The system of claim 14 wherein the means responsive to variations in amplitudes comprises: a detector for detecting the output of said electronic device, and a motor system for rotating one tuning element of a tuned circuit at a time in a direction that depends upon the phase relationship between the output of said detector and the operation of said sampling switch.

16. The system of claim 13 wherein the means for conducting said waves to the input of said electronic device comprises: means for alternately modulating the outputs of the signal generators of each of said pairs wherein the modulating signal for the outputs for each pair of generators is distinctive, and adding means for combining and conducting all of the modulated signals to the input of said electronic device.

References Cited in the file of this patent

UNITED STATES PATENTS 2,584,004 Enslein ---------------- Jan. 29, 1952